United States Patent [19]

Livingston

[11] 4,218,968
[45] Aug. 26, 1980

[54] NUT CRACKING MACHINE

[76] Inventor: Almer K. Livingston, P.O. Box 66, Smithville, Ga. 31787

[21] Appl. No.: 69,430

[22] Filed: Aug. 24, 1979

[51] Int. Cl.³ .......................... A23N 5/00; A47J 43/26
[52] U.S. Cl. ...................................... 99/572; 99/575; 99/578; 99/583
[58] Field of Search ................. 99/571, 572, 574, 575, 99/577, 578, 579, 576, 581–583, 628, 617–622; 30/120.1, 120.2

[56] References Cited

U.S. PATENT DOCUMENTS

| | | | |
|---|---|---|---|
| 254,812 | 3/1882 | Gathmann | 99/575 |
| 955,532 | 4/1910 | McFarlane | 99/575 |
| 1,116,611 | 11/1914 | Nash | 99/618 |
| 1,591,251 | 7/1926 | Vaughan | 99/575 |
| 1,710,459 | 4/1929 | Romero | 99/618 |
| 3,540,504 | 11/1970 | Hall et al. | 99/577 |
| 3,662,799 | 5/1972 | Shaw | 99/574 |

Primary Examiner—Philip R. Coe
Assistant Examiner—Timothy F. Simone
Attorney, Agent, or Firm—Beveridge, DeGrandi, Kline & Lunsford

[57] ABSTRACT

A nut cracking machine including a pair of spaced apart cracking plates having confronting cracking faces provided with cracking means thereon, the cracking faces and cracking means thereof being disposed to distribute cracking forces substantially tangentially along the periphery of the shell of a nut received therebetween, for rolling and cracking engagement of a nut, rather than crushing of the same; one of the cracking plates comprising a stationary base plate and the other comprising a rotatable holding plate that is moveable toward and away from the base plate; limit means for initial positioning of the cracking face of the holding plate apart from the cracking face of the base plate according to the proximate diameter of the nut to be cracked, for insertion of a nut therebetween, and thrust means operative on rotation of the holding plate for movement of the holding plate toward the base plate in juxtaposed relation for rolling and cracking engagement of the shell of a nut received therebetween and, on completion of the nut cracking circuit of the holding plate, to return the same to initial positioning thereof, for removal of the nut as cracked between the base plate and the holding plate.

20 Claims, 7 Drawing Figures

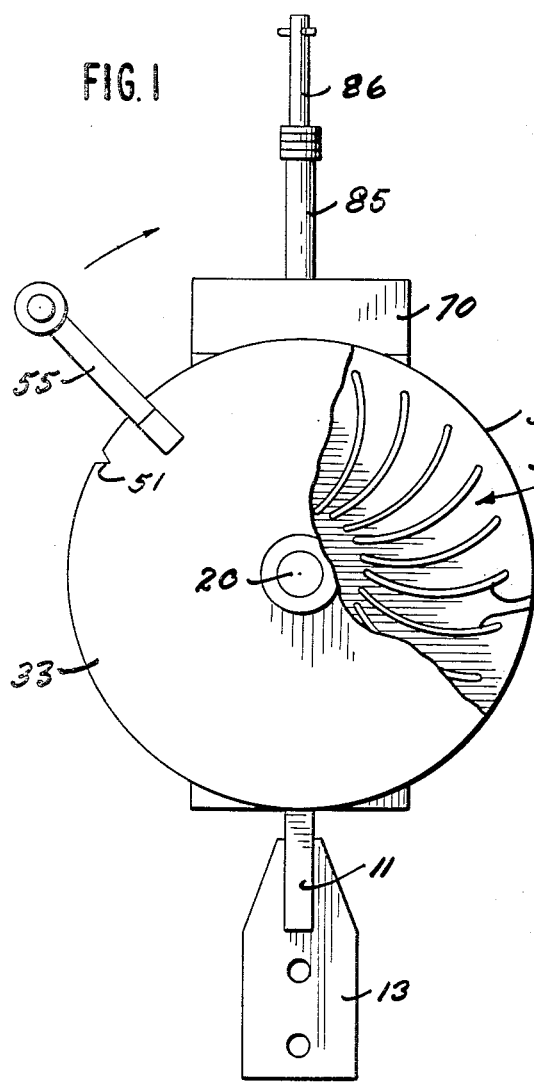
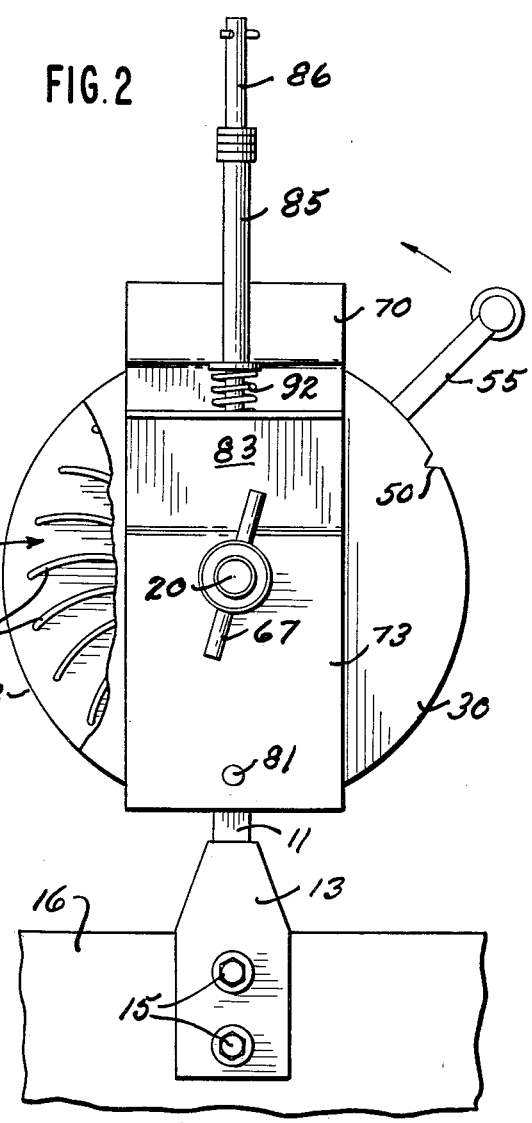
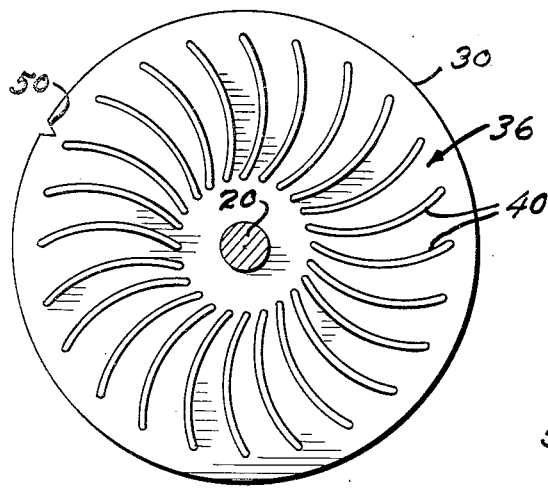
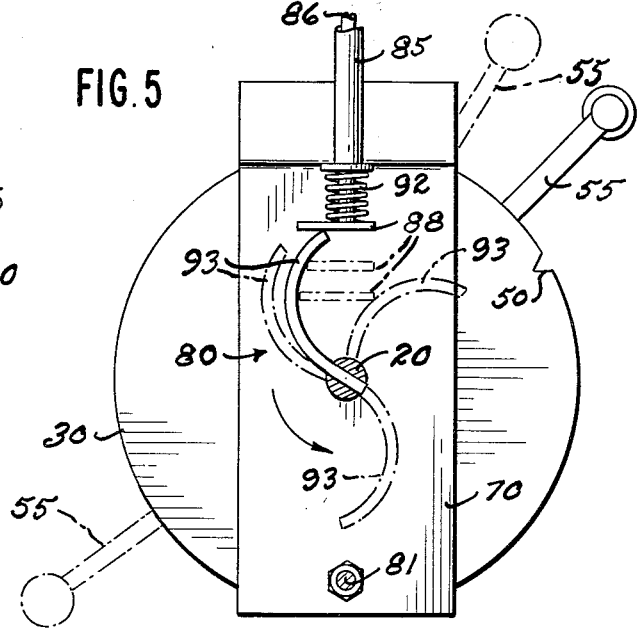

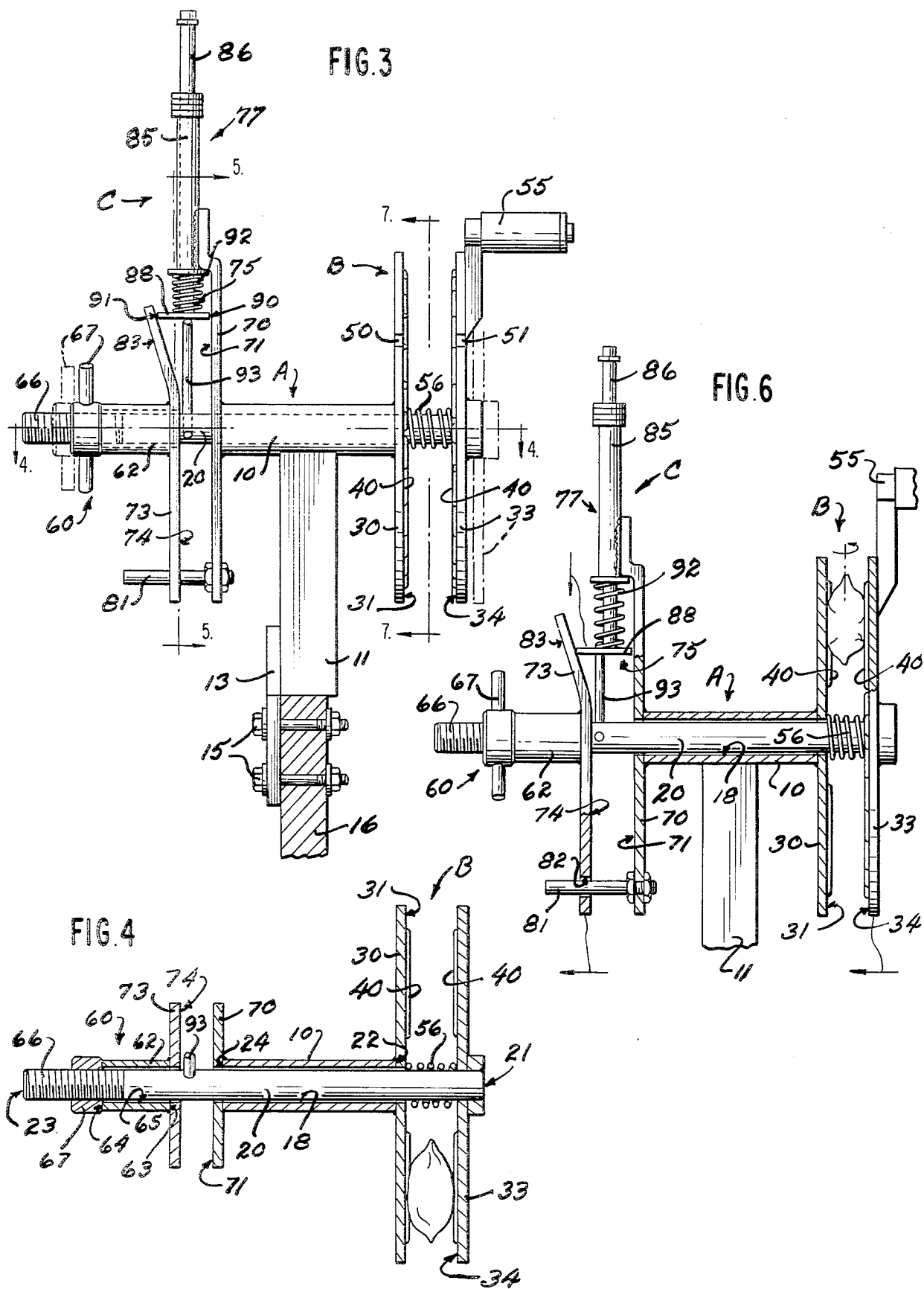

NUT CRACKING MACHINE

BRIEF SUMMARY OF THE INVENTION

This invention relates to improvements in nut cracking machines.

It has long been a problem to crack nuts in a manner so that a whole nut meat can be removed therefrom. This has proven to be particularly true in connection with nuts having a hard but thin shell, such as pecans. In this regard, the present invention was primarily developed for cracking pecan nuts, but it is obvious that the same may be used to crack various other kinds of nuts.

I am aware that others have previously attempted to provide nut cracking meachines and devices, for instance, as shown in U.S. Pat. Nos. 1,194,318; 1,591,251; 2,321,795; and 2,631,626. However, all of these devices operate to crush rather than crack nuts placed therein. Each generally provides converging cracking faces, one being stationary and the other rotatable, and as the nut passes through the ever more restricted area between the cracking faces, the nut is crushed therebetween.

In the present invention, the nut cracking force is not the result of crushing the nut between the cracking faces, but rather the shell of the nut is cracked by rolling engagement with the cracking means thereof in a manner so that the cracking forces are distributed peripherally along the shell rather than transversely through the nut. It is thus a primary object of this invention to provide a nut cracking machine in which the shell of a nut received thereby is cracked by moments of force acting in directions substantially tangentially along the periphery of the shell thereof.

A further object of the invention is the provision of a nut cracking machine that is substantially self-adjusting as to minor irregularities and variations in the diameter of the shells of nuts to be cracked thereby. That is, a machine which is pre-set according to the general diameter of the shells of a group of nuts to be received thereby and which is thereafter self-adjusting as to minor irregularities and variations in the diameter of the shells thereof.

Other objects and advantages of the invention will become apparent during the course of the following detailed description, taken in connection with the accompanying drawings, and in which drawings:

BRIEF DESCRIPTION OF THE DRAWINGS

FIG. 1 is a front view of my improved nut cracking machine, parts thereof being broken away to disclose preferred details.

FIG. 2 is a rear view thereof, parts thereof being broken away to disclose preferred details.

FIG. 3 is a side view thereof, as viewed from the left hand side of the showing of FIG. 1;

FIG. 4 is a transverse sectional view taken substantially along the line 4—4 of FIG. 3 and showing initial placement of a nut between the cracking faces of my improved nut cracking machine.

FIG. 5 is a vertical sectional view taken substantially along the line 5—5 of FIG. 3 and showing, in dot and dash lines, operative rotation of the cam means of my improved nut cracking machine.

FIG. 6 is a fragmentary view similar to FIG. 3 and showing operation of my improved nut cracking machine as the cam means thereof is rotated, as shown in the dot and dash lines of FIG. 5, for rolling and cracking engagement of the shell of a nut received thereby.

FIG. 7 is a vertical sectional view taken substantially along the line 7—7 of FIG. 3, and showing the configuration of the cracking means of the cracking faces of my improved nut cracking machine.

DETAILED DESCRIPTION

In the drawings, wherein is showed a preferred embodiment of the invention, and wherein similar reference characters designate corresponding parts throughout the several views, the letter A may generally designate the frame of my improved nut cracking machine; the letter B the cracking means thereof and the letter C the thrust means thereof which facilitates the operative rolling and cracking engagement of the shell of a nut by cracking means B thereof.

Frame A preferably includes a housing, which may comprise an elongated tubular sleeve 10, having a mounting bracket 11 attached thereto. The lower end of mounting bracket 11 may be provided with a mounting plate 13 through which bolts 15 may be received in attachment of the same to a suitable support 16. Support 16 may, for instance, comprise the side of a box or other container within which may be received the cracked nuts.

Elongated tubular sleeve 10 is provided with an elongated bore 18 within which a shaft 20 may be rotatably supported. Shaft 20 is preferably rotatably supported by tubular sleeve 10 in a manner to be laterally moveable within bore 18 thereof. End 21 of shaft 20 extends outwardly from end 22 of tubular sleeve 10 and end 23 thereof extends outwardly from end 24 of tubular sheeve 10.

Cracking means B preferably includes a base plate or disc 30 having a cracking face 31, and a holding plate or disc 33 having a cracking face 34. Nut cracking means 36 are provided on cracking faces 31 and 34.

Cracking faces 31 and 34 are preferably substantially planar, extending transverse to the axis of shaft 20 in a substantially parallel spaced apart confronting relation.

As best shown in FIG. 7, cracking means 36 may comprise a plurality of spaced apart rib means 40, providing raised portions extending above the surface of the cracking face thereof. Rib means 40 may be radially arcuate, with the convexities thereof facing in the same circumferential direction on a given cracking face.

As shown, the convexities of rib means 40 of base disc 30 face in the circumferential direction of rotation of holding disc 33 and rib means 40 of holding disc 33 face in the circumferential direction opposite to the direction of rotation thereof.

It is, of course, obvious that rib means 40 may be other than an arcuate configuration facing in a particular direction along cracking faces 31 and 34. Although I consider that optimum results will be obtained when rib means 40 extend in generally radial directions from shaft 20, it is obvious that they may be otherwise configured.

Base disc 30 is preferably provided with index means 50, which may comprise a notch in the periphery thereof; and holding plate 33 is provided with index means 51, which may comprise a notch in the periphery thereof, the purposes of which will be subsequently described.

Base disc 30 is preferably attached to end 22 of tubular sleeve 10, which provides mounting means for supporting base disc 30 on frame A in substantially fixed position.

Holding disc 33 is preferably attached to shaft 20, adjacent end 21 thereof, for rotation with shaft 20, and which provides mounting means for rotatably and moveably supporting holding disc 30 on frame A. A crank arm 55 may be attached to holding disc 33, providing means for rotating of holding disc 33 and shaft 20.

A compression spring 56 is preferably mounted on shaft 20, between base disc 30 and holding disc 33, comprising means for lateral movement of shaft 20 and holding disc 33 in a direction to urge holding disc 33 away from base disc 30, in order that a nut may be readily received between the confronting cracking faces 31 and 34 thereof.

Disc 33 is thus rotatably supported with cracking face 34 thereof substantially planar to cracking face 31 of base plate 30 and is lineally moveable toward and away from base plate 30 along the axis of rotation thereof.

Limit means 60 is provided adjacent end 23 of shaft 20, and cooperates with the thrust means C in a manner to provide a adjustment means for regulating the spacing apart of the cracking face 34 of holding plate 33 from cracking face 31 of base disc 30 in an operable relation according to the proximate diameter of the shell of a nut to be received therebetween.

Limit means 60 preferably includes a sleeve 62 having an inner end 63 and an outer end 64, and a bore 65 through which shaft 20 is rotatably received. End 23 of shaft 20 is preferably provided with screw threads 66, which receive a lug 67 in abutment with end 64 of sleeve 62.

Thrust means C preferably includes an elongated backing plate 70, mounted on end 24 of tubular sleeve 10, and having an outwardly disposed guide face 71 extending transversely to the axis of shaft 20; an elongated floating plate 73, mounting on end 63 of sleeve 62, which comprises support means for mounting floating plate 73 on shaft 20 for lateral movement axially with shaft 20, and having a guide face 74 confronting guide face 71 of backing plate 70; wedge means 75; plunger means 77, which comprises mounting means for supporting wedges mean 75 in operable abutment with guide 71 and 74; and cam means 80 mounted on shaft 20 for operable abutment with wedge means 75 in delineating operative movement thereof.

A guide pin 81 may be attached adjacent the lower end of backing plate 70. to be received through opening 82 of floating plate 73, for guiding movement of floating plate 73 toward and away from backing plate 70.

The upper end of floating plate 73 is preferably angled to diverge away from backing plate 70 as at 83, in a manner so that guide faces 71 and 74 define a guideway for wedge means 75 which increases in width as wedge means 75 moves away from shaft 20.

Plunger means 77 preferably includes elongated tubular housing 85 attached to the upper end of backing plate 70, and within which is slideably received an elongated shaft 86. Wedge means 75 preferably comprises a plate 88 attached to the lowermost end of shaft 86, having a side 90 in sliding abutment with guide face 71 of backing plate 70, and a side 91 in sliding abutment with guide face 74 of floating plate 73. A compression spring 92 is mounted on shaft 86, in operative abutment at one end thereof with housing 85 and in operative abutment at the other end thereof with plate 88, for urging plate 88 along guide faces 71 and 74 in a direction toward shaft 20.

Cam means 80 preferably comprises an arcuately shaped cam shaft 93, one end thereof being attached to shaft 20, for rotation therewith, the convexity of shaft 93 extending in the direction of rotation of shaft 20, and being positioned for abutment with plate 88 at a first position thereof in providing an actuating means for holding plate 88 at a given spaced apart first position away from shaft 20 and being moveable on rotation of shaft 20 to move out of abutment with plate 88, to permit plate 88 to move toward shaft 20, and, on continued rotation of shaft 20, to again abut plate 88 to return the same to the first position of spaced apart relation thereof from shaft 20.

Cam 80 is preferably shaped so that, on rapid rotation of shaft 20, cam 80 only momentarily returns wedge means 75 to its first position a given distance away from shaft 20, for a purpose as will be subsequently described.

In operation of my improved nut cracking machine, holding plate 33 is rotated (in a clockwise direction in accordance with the configuration of cam means 93 as shown) to a position as shown in FIG. 3, in which index means 51 of holding plate 33 is aligned with index means 50 of base plate 30, and in which position cam means 80 will be in abutment with plate 88 of thrust means C, holding the same at a maximum spaced apart distance from shaft 20. Lug 67 of limit means 60 is then threaded on threads 66 of shaft 20 in an appropriate direction to provide the desired spacing apart of holding plate 33 from base plate 30, according to the approximate diameter of the shell of the nut to be received therebetween, and so that the same may be readily interfitted between confronting cracking faces 31 and 34 of base plate 30 and holding plate 33, as shown in FIG. 4. On rotation of holding plate 33 (again in a clockwise direction according to the configuration of cam means 80 as shown), cam means 80 moves out of abutment with holding plate 88, as shown in FIG. 5, plate 88 being urged by spring 92 of thrust means C in a direction toward shaft 20, along guide faces 90 and 91 of backing plate 70 and floating plate 73, which moves floating plate 73 away from backing plate 70 and thereby laterally moves shaft 20 in a direction to pull holding plate 33 toward base plate 30, against the action of compression spring 56, whereby to firmly grip a nut between the confronting cracking faces 31 and 34 of base plate 30 and holding plate 33, as shown in FIG. 6. On continued rotation of holding plate 33, rib means 36 of confronting cracking faces 31 and 34 tangentially abut against and along the periphery of the shell of the nut held therebetween, in rolling and cracking engagement with the shell thereof.

In the case of thin shelled nuts, a single complete rotation of holding plate 33 will usually be sufficient to crack the nut shell. On completion of rotation, with index means 51 of holding plate 33 again aligned with index means 50 of base plate 30, cam means 80 will again have moved into full abutment with plate 88 of thrust means C, lifting the same away from shaft 20, and enabling compression spring 56 to urge holding plate 33 away from base plate 30, as shown in FIG. 4, whereby the nut therebetween may fall into an appropriate container for further treatment thereof.

In the case of nuts having a thick shell, and in which case more than a single revolution of holding plate 33 is necessary, it will be noted that cam means 80 has a position of only very brief abutment with plate 88, so that when holding plate 33 is rapidly rotated, the nut received between the confronting cracking faces 31 and 34 is not likely to fall from therebetween.

Various changes may be made to the form of the invention herein shown and described without departing from the spirit of the invention or the scope of the following claims.

I claim:

1. A nut cracking machine including a frame; a base plate having a substantially planar cracking face provided with a plurality of spaced apart rib means projecting above the surface of said substantially planar cracking face; mounting means for supporting said base plate on said frame in a substantially fixed position; a holding plate having a substantially planar cracking face provided with a plurality of spaced apart rib means projecting above the surface of said substantially planar cracking face; mounting means for rotatably supporting said holding plate of said frame with said cracking face thereof substantially parallel to and confronting said cracking face of said base plate in spaced apart relation thereto and for lineal movement thereof toward and away from said base plate along the axis of rotation thereof; means for rotation of said holding plate; spring means for urging said holding plate away from said base plate for receiving a nut between the confronting cracking faces thereof; and thrust means rendered operational by rotation of said holding plate to axially move said holding plate against the urging of said spring means and toward said base plate for retaining a nut between the cracking faces thereof and in rolling and cracking engagement therewith.

2. A nut cracking machine as specified in claim 1 wherein said rib means of said base plate are in substantially parallel planar relation to said rib means of said holding plate, said rib means of each said base plate and said holding plate being substantially elongate and extending radially from the axis of rotation of said holding plate in juxtaposed relation for distributing the force lines of cracking engagement thereof substantially tangentially along the periphery of the shell of a nut received between the cracking faces thereof.

3. A nut cracking machine as specified in claim 2 wherein said rib means of said base plate are radially arcuate and the convexities thereof face in the same circumferential direction.

4. A nut cracking machine as specified in claim 2 wherein said rib means of said holding plate are radially arcuate and the convexities thereof face in the same circumferential direction.

5. A nut cracking machine as specified in claim 2 wherein said rib means of each said base plate and said holding plate are radially arcuate, the convexities of each facing in the same circumferential direction, the circumferential direction of the convexities of said base plate being opposite to the convexities of said holding plate.

6. A nut cracking machine as specified in claim 5 wherein the convexities of said rib means of said base plate face in the circumferential direction of rotation of said holding plate and said rib means of said holding plate face in the circumferential direction opposite to the direction of rotation of said holding plate.

7. A nut cracking machine as specified in claim 1 wherein said base plate and said holding plate are respectively indexed to collocate rotation of said holding plate with respect to said base plate and said thrust means includes actuating means having a first location positioning said thrust means to enable operation of said spring means for urging said holding plate away from said base plate as said base plate and said holding plate are so indexed; initial spatial rotation of said holding plate moving said actuating means to a second location to render said thrust means operational for axially moving said holding plate toward said base plate; and, on continued rotation of said holding plate, to return to said first position thereof.

8. A nut cracking machine as specified in claim 7 wherein said actuating means includes means momentarily operable at said first position thereof for enabling retention of a nut between the confronting faces of said base plate and said holding plate as said holding plate is rapidly rotated through more than one complete revolution.

9. A nut cracking machine as specified in either of claims 1, 7 or 8 wherein said mounting means for said holding plate includes limit means for spacing apart said cracking face of said holding plate from said cracking face of said base plate in operable relation according to the proximate periphery of the shell of a nut to be received therebetween.

10. A nut cracking machine including a frame having a housing thereon; an elongated shaft rotatably supported by said housing and laterally moveable with respect thereto; a base disc substantially fixedly mounted on said frame at one end of said housing, said base disc having a cracking face extending transverse to the axis of said shaft and provided with a plurality of nut cracking means; a holding disc mounted on said shaft for rotational and lateral movement with said shaft and positioned thereon in spaced apart adjacency to said base disc, said holding disc having a cracking face extending transverse to the axis of said shaft and confronting the cracking face of said base disc, said cracking face of said holding disc having a plurality of nut cracking means provided thereon; means for lateral movement of said shaft and said holding disc to urge said holding disc away from said base disc for receiving a nut between the confronting cracking faces thereof; means for rotation of said holding disc and said shaft; and thrust means mounted on said housing and operatively engageable with said shaft for lateral movement of said shaft and said holding plate to urge said holding disc toward said base disc in juxtaposed relation for rolling and cracking engagement of said cracking means thereof with the shell of a nut received between the cracking faces thereof, said thrust means including means operating said thrust means by rotation of said holding plate and said shaft.

11. A nut cracking machine as specified in claim 10 wherein said thrust means includes a backing plate mounted on said frame at the opposite end of said housing from said base disc, said backing plate having an outwardly disposed guide face extending transversely to the axis of said shaft, a floating plate having a guide face extending transversely to the axis of said shaft and confronting said guide face of said backing plate, at least one said guide face diverging from the other as the same extend outwardly from said shaft, support means for mounting said floating plate on said shaft for lateral movement axially with said shaft, wedge means, mounting means for supporting said wedge means in operable abutment with said guide face of said backing plate and said guide face of said floating plate and for operative movement thereof in juxtarelation to urge said floating plate apart from said backing plate, limit means mounted on said shaft and abutting said support means for mounting said floating plate on said shaft in operative relation for lateral movement of said shaft in urging said holding disc toward said base disc on operative movement of said wedge means.

12. A nut cracking machine as specified in claim 11 wherein said mounting means for supporting said wedge means includes plunger means mounted on said backing plate and engageable with said wedge means for operative movement thereof, said shaft means having cam means mounted thereon in operable abutment with said wedge means for delineating operative movement thereof.

13. A nut cracking machine as specified in claim 12 wherein said base disc and said holding disc are indexed with respect to each other, said cam means being configured to delineate a first position of said wedge means for permitting operation of said means for lateral movement of said shaft in urging said holding disc in a spaced apart operative relation away from said base disc for receiving a nut therebetween when said base disc and said holding disc are indexed with respect to each other, on initial spatial rotation of said holding plate and said shaft to delineate a second position of said wedge means for operative movement thereof in urging said holding disc toward said base disc and, on continued rotation of said shaft and said holding disc, to return said wedge means to said first position thereof as said holding disc is rotated to a position as indexed with said base disc.

14. A nut cracking machine as specified in claim 13 wherein said cam means is configured to only momentarily delineate said first position of said wedge means for enabling retention of a nut between said base disc and said holding disc during more than one complete revolution of said pressure disc.

15. A nut cracking machine as specified in claim 10 wherein said limit means is laterally adjustable along said shaft for delineating the operative length of said shaft in spacing of said holding disc from said base disc according to the size of the nut to be received between the confronting cracking faces thereof.

16. A nut cracking machine as specified in claim 15 wherein said support means for mounting said floating plate on said shaft comprises a tubular sleeve mounted on said shaft, said floating plate being mounted at one end thereof, the end of said shaft adjacent the other end of said tubular sleeve is provided with screw threads, and said limit means comprises a lug engageable with said screw threads for positioning thereof along said shaft to abut against the other end of said tubular sleeve from said floating plate.

17. A nut cracking machine as specified in claim 10 wherein said means for lateral movement of said shaft in urging said holding disc in a spaced operative relation away from said base disc comprises spring means mounted on said shaft in operative abutment against said base disc and said holding disc.

18. A nut cracking machine as specified in claim 10 wherein said means for rotation of said holding disc and said shaft comprises a crank arm mounted on said holding disc.

19. A nut cracking machine including a pair of spaced apart cracking plates having confronting cracking faces provided with cracking means thereon, one of said cracking plates comprising a stationary base plate and the other comprising a rotatable holding plate, one said cracking plates being moveable toward and away from the other of said cracking plates, limit means for spacing apart said cracking plates according to the proximate diameter of nuts to be received therebetween, and thrust means for moving said moveable one of said cracking plates toward the other of said cracking plates for rolling and cracking engagement of a nut received therebetween, said thrust means having self-adjusting means to account for minor irregularities and variations in the diameter of nuts placed between said cracking plates in gripping a nut therebetween for rolling and cracking engagement of said cracking plates therewith and means operating said thrust means by rotation of said rotatable holding plate.

20. A nut cracking machine as specified in claim 19 wherein said cracking means of each said cracking faces are configured for distributing the force lines of cracking engagement thereof substantially tangentially along the periphery of the shell of a nut received between said cracking faces.

* * * * *